United States Patent [19]

Jones et al.

[11] 4,312,977

[45] Jan. 26, 1982

[54] PROCESS FOR THE PRODUCTION OF HIGH MOLECULAR WEIGHT OXYMETHYLENE COPOLYMER IN THE PRESENCE OF IMPURITY

[75] Inventors: Rufus S. Jones, Randolph; Frank M. Berardinelli, Millington, both of N.J.

[73] Assignee: Celanese Corporation, New York, N.Y.

[21] Appl. No.: 176,766

[22] Filed: Aug. 11, 1980

[51] Int. Cl.$^3$ ................................................ C08G 2/06
[52] U.S. Cl. .................................... 528/241; 528/232
[58] Field of Search ................................. 528/232, 241

[56] References Cited

U.S. PATENT DOCUMENTS

| 3,027,352 | 3/1962 | Walling et al. | 528/241 |
| 3,376,361 | 4/1968 | Halek et al. | 528/241 |
| 3,597,397 | 8/1971 | Chen | 528/241 |
| 4,087,411 | 5/1978 | Sugio et al. | 528/241 |
| 4,224,435 | 9/1980 | Sugio et al. | 528/232 |

Primary Examiner—Lucille M. Phynes

Attorney, Agent, or Firm—Charles B. Barris

[57] ABSTRACT

A process for the production of high molecular weight oxymethylene copolymer in the presence of impurity is provided. The process provides a high molecular weight oxymethylene copolymer having a predetermined comonomer content. The process comprises the steps of determining the optimal catalyst concentration in a first oxymethylene copolymerization system which contains less than approximately 10 p.p.m. impurity; determining the concentration of impurity containing at least one active proton in a second copolymerization system; adjusting the catalyst concentration in the second copolymerization system so that the total concentration of catalyst and impurity in the second copolymerization system is maintained at the optimal concentration of catalyst in the first copolymerization system; and adjusting the concentration of comonomer in the second copolymerization system so as to maintain the predetermined comonomer content in the oxymethylene copolymer product.

20 Claims, No Drawings

PROCESS FOR THE PRODUCTION OF HIGH MOLECULAR WEIGHT OXYMETHYLENE COPOLYMER IN THE PRESENCE OF IMPURITY

BACKGROUND OF THE INVENTION

The present invention relates to a process for the production of high molecular weight oxymethylene copolymer having a predetermined comonomer content. The process provides the desired product by compensating for the presence of impurity which contains at least one active proton.

Oxymethylene polymers having successively recurring oxymethylene units are useful in the production of molded and extruded objects. Such polymers have excellent physical properties and produce strong molded objects. The thermal stability of oxymethylene polymers may be enhanced by the incorporation into the polymer molecule of interspersed comonomeric units having adjacent carbon atoms. It is desirable to incorporate such comonomeric units in controlled amounts since excessive proportions of interspersed comonomeric units impair the physical properties of the polymers while insufficient amounts of the comonomeric units fail to provide the required thermal stability.

The amount of comonomer to be incorporated into an oxymethylene polymer for optimum enhancement of thermal stability without impairment of physical properties will vary depending upon the particular comonomer used and depending upon the properties desired in the copolymer. For copolymers having oxymethylene groups interspersed with groups derived from a cyclic ether, such as the copolymers described in U.S. Pat. No. 3,027,352, the proportion of comonomer units generally varies from about 0.1 to about 15 percent of the total monomeric units. The preferred copolymers contain from about 0.1 to about 5 percent of comonomer units.

In said U.S. Pat. No. 3,027,352, which is herein incorporated by reference, stable copolymers having successively recurring oxymethylene groups are prepared by copolymerizing trioxane with a cyclic ether. In accordance with the present invention stable copolymers are prepared by copolymerizing formaldehyde with a cyclic ether or with other comonomers having adjacent carbon atoms, as explained more fully hereinbelow.

The copolymerization of formaldehyde with comonomers having adjacent carbon atoms presents problems which the copolymerization of trioxane does not present. It has been found that while it is relatively easy to produce copolymers of formaldehyde having relatively high proportions of comonomeric units incorporated therein, it is exceedingly difficult to prepare copolymers having the low desired proportions of comonomeric units which provide stability but, at the said time, do not impair the physical properties of the homopolymer.

The prior art has attempted to copolymerize formaldehyde with other monomers in a liquid medium wherein formaldehyde and the desired comonomers are continuously introduced in admixture. In such polymerization systems it has been found that when the admixture contains a relatively high proportion of comonomer the copolymerization proceeds satisfactorily but produces a copolymer containing an excessive amount of comonomeric units for optimum physical properties. On the other hand, when the admixture contains a relatively low proportion of comonomer the prior art polymerization processes produce formaldehyde homopolymer while the comonomer either remains unreacted or reacts only with itself to produce a second homopolymer in admixture with the formaldehyde homopolymer.

The prior art has also attempted to copolymerize formaldehyde with another monomer by feeding formaldehyde into a reaction zone which already contains, dissolved in an inert solvent, all of the comonomer to be reacted. In such polymerization systems, it has been possible to control the total amount of comonomer in the copolymer product, but the distribution of comonomer has been unsatisfactory. It appears that the initial polymerization takes place in a reaction zone containing excessive concentrations of comonomer so that the comonomer combines with itself to produce the comonomer chain segments within the molecule thereby providing poor distribution of comonomer units in the final polymer.

U.S. Pat. No. 3,376,361 discloses a method of producing a polymer having successively recurring oxymethylene groups interspersed with divalent comonomeric groups having adjacent carbon atoms. The process comprises passing a mixture of formaldehyde and a comonomer into a reaction zone in the presence of an inert liquid solvent and a cationic catalyst. The comonomer has adjacent carbon atoms and is capable of copolymerization with formaldehyde in the presence of said cationic catalyst. The mixture is reacted to produce a prepolymer and the prepolymer is thereafter reacted with additional formaldehyde.

In order to consistently obtain oxymethylene copolymers having a high molecular weight and having a desired, predetermined comonomer content, such prior art formaldehyde copolymerization processes have had to employ pure reactants, solvent, and catalyst so that the overall reaction system contained less than approximately 10 p.p.m. impurity (as hereinafter defined).

However, commercial solvents and formaldehyde streams commonly contain significant quantities of impurity, such as water, formic acid, methanol, etc. When such commercial solvents and reactants have been utilized in formaldehyde copolymerization processes, the molecular weight of the oxymethylene copolymer product has tended to be depressed, and the comonomer content of the copolymer has been difficult to control.

It is therefore an object of the present invention to provide a process for the production in the presence of impurity of oxymethylene copolymer having high molecular weight and a predetermined comonomer content.

It is also an object of the present invention to provide a process for the production of oxymethylene copolymer having high molecular weight and a predetermined comonomer content which compensates for the presence of impurity.

It is also an object of the present invention to provide a process for the production of oxymethylene copolymer having high molecular weight, a predetermined comonomer content, and randomly distributed comonomer units.

It is also an object of the present invention to provide a process for the production in the presence of impurity of oxymethylene copolymer having high molecular weight and a predetermined comonomer content, the process being more economical than prior art formaldehyde copolymerization processes.

SUMMARY OF THE INVENTION

A process for the production of high molecular weight oxymethylene copolymer having a predetermined comonomer content is provided. The process compensates for the presence of impurity during the copolymerization. The oxymethylene copolymer has recurring units consisting essentially of (A) —OCH$_2$— groups with which are interspersed

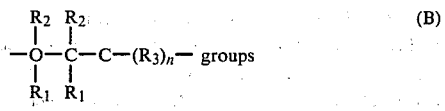

where each R$_1$ and R$_2$ is selected from the group consisting of hydrogen, lower alkyl radicals, and halogen substituted lower alkyl radicals, each R$_3$ is selected from the group consisting of methylene, oxymethylene, lower alkyl and haloalkyl substituted methylene, and lower alkyl and haloalkyl substituted oxymethylene radicals, and n is an integer from 0 to 3, each lower alkyl radical having 1 to 2 carbon atoms, the (A) groups constituting 85 to 99.9 percent of the recurring units. The oxymethylene copolymer is formed by the reaction of formaldehyde and a comonomer in the presence of a solvent and an inorganic fluoride catalyst, the comonomer comprising at least one cyclic ether having adjacent carbon atoms and being capable of copolymerizing with formaldehyde and the solvent being selected from the group consisting of cyclopentane, cyclohexane, cycloheptane, alkyl derivatives of the foregoing wherein the alkyl groups contain up to 4 carbon atoms, and mixtures thereof. The process comprises the steps of:

(a) determining the optimal concentration of catalyst in a first oxymethylene copolymerization system containing less than approximately 10 p.p.m. of impurity containing active protons, the optimal concentration of catalyst providing high molecular weight oxymethylene copolymer product;

(b) determining the concentration of impurity in a second oxymethylene copolymerization system which contains impurity, the impurity containing at least one active proton;

(c) adjusting the concentration of the catalyst in the second oxymethylene copolymerization system so that the total concentration of the impurity and the catalyst in the second oxymethylene copolymerization system is maintained at the optimal concentration of catalyst in the first oxymethylene copolymerization system, the concentration of the impurity being no greater than approximately 70 percent of the cocentration of the catalyst; and (d) adjusting the concentration of the comonomer in the second oxymethylene copolymerization system to compensate for the adjustment in the concentration of the catalyst so as to maintain the predetermined comonomer content in the oxymethylene product.

DETAILED DESCRIPTION OF THE INVENTION

The present invention provides a process for the production in the presence of impurity of high molecular weight oxymethylene copolymer having a predetermined comonomer content.

The term "high molecular weight" as used herein denotes a copolymer having a number average molecular weight (M$_n$) of at least approximately 20,000, preferably within the range of approximately 35,000 to 65,000, and most preferably of approximately 55,000. Such a molecular weight is commonly indicated by an inherent viscosity of at least approximately 1.4 dl./g., e.g., within the range of approximately 1.4 to 2.0 dl./g., when measured in a concentration of 0.1 percent by weight of copolymer in p-chlorophenol at 60° C.

Comonomer content can be determined by Fourier transform infrared spectroscopy and by gas chromatographic analysis of the acidic (HCl) methanolysis products of the copolymer. Preferably, the copolymer contains approximately 1 to 5 weight percent of randomly dispersed oxyethylene (—O—CH$_2$—CH$_2$—) units.

The oxymethylene copolymer has recurring units consisting essentially of (A) —OCH$_2$—groups with which are interspersed with

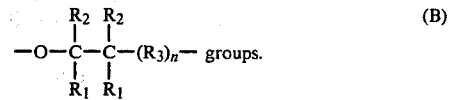

Each R$_1$ and R$_2$ is selected from the group consisting of hydrogen, lower alkyl radicals, and halgen substituted lower alkyl radicals, each R$_3$ is selected from the group consisting of methylene, oxymethylene, lower alkyl and haloalkyl substituted methylene, and lower alkyl and haloalkyl substituted oxymethylene radicals, and n is an integer from 0 to 3, each lower alkyl radical having 1 to 2 carbon atoms. The (A) groups constitute 85 to 99.9 percent of the recurring units.

Particularly preferred oxymethylene polymers are those having incorporated therein oxyalkylene units having adjacent carbon atoms which are derived from cyclic ethers having adjacent carbon atoms and being capable of copolymerizing with formaldehyde. Such cyclic ethers have the structure

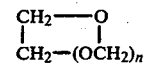

where n is an integer from 0 to 2. The comonomers disclosed in U.S. Pat. No. 3,027,352, and especially ethylene oxide, dioxolane, and mixtures thereof, are particularly desirable. Dioxolane is the most preferred comonomer because, unlike ethylene oxide, it provides copolymer products in which the oxyethylene units (—CH$_2$—CH$_2$—O—) are well dispersed throughout the polymer as single units. Such an arrangement of the oxyethylene units is particularly favorable for providing the properties desired of oxymethylene copolymers.

The catalysts which may be used in the process of the present invention are inorganic fluorides such as antimony trifluoride, antimony fluoborate, bismuth trifluoride, nickelous fluoride, bismuth oxyfluoride, aluminum trifluoride, titanium tetrafluoride, manganous fluoride, zinc fluoride, ammonium bifluoride, phosphorus pentafluoride, hydrogen fluoride, and fluorosulfonic acid.

The preferred catalysts are boron trifluoride, its organic complexes, and mixtures thereof. Boron fluoride organic complexes include boron trifluoride diethyl etherate and boron trifluoride dibutyl etherate.

The solvents which may be used in the process of the present invention include cyclopentane, cyclohexane, cycloheptane, alkyl derivatives of the foregoing wherein the alkyl groups contain up to 4 carbon atoms, and mixtures thereof. The preferred solvent is cyclohexane.

In carrying out the polymerization reaction, the reaction vessel is charged with solvent and catalyst in the desired concentration. Formaldehyde and comonomer are then charged to the reaction vessel and mixed with the solvent and catalyst. When a liquid comonomer, such as dioxolane, is used, the comonomer is added directly to the reactor to give a solution of desired concentration prior to the continuous addition of the gaseous formaldehyde. The comonomer is commonly present in a concentration within the range of approximately 0.25 to 2.0 mole/liter, preferably within the range of approximately 0.3 to 0.8 mole/liter, and more preferably of approximately 0.5 mole/liter. When a gaseous comonomer such as ethylene oxide is used, the comonomer can be mixed with the gaseous formaldehyde and the reactant mixture can be added to the reaction vessel continuously. Such a gaseous mixture comprises approximately 1 to 20 weight percent of comonomer, and preferably approximately 2 to 5 weight percent (e.g., approximately 3 weight percent).

If desired, it is also possible to simultaneously and continuously feed separate streams of formaldehyde, comonomer, and catalyst to the reaction vessel.

All concentration values, except as otherwise noted, are expressed as moles per liter, based upon the total liquid volume, including solvent, catalyst, and reactants.

The temperature of the reaction may vary from a minimum of approximately 0° C. to a maximum of approximately 100° C. In the copolymerization of formaldehyde with a cyclic ether such as ethylene oxide or dioxolane, the preferred temperature is from approximately 25° C. to approximately 70° C., e.g., approximately 35° C. to 40° C.

Since the copolymerization of formaldehyde is a heterophase reaction, with formaldehyde available both in solution and as a dispersed gas, the physical configuration of the reactor is an important variable. In the process steps to be hereinafter described, conditions which might affect formaldehyde dispersion and contact time must be standardized.

The process of the present invention contemplates employing a reaction system containing significant quantities of impurity. The term "impurity", as used herein, denotes a compound or compounds containing at least one active proton. Such impurity may be, for example, water, formic acid, methanol, and mixtures thereof.

The present process, which allows the presence of impurity during oxymethylene copolymerization, obviates the need for obtaining and using pure (i.e., containing less than approximately 10 p.p.m. impurity) reactants, solvent, and catalyst. It is anticipated that the major sources of impurity will be the solvent and formaldehyde because the catalyst and comonomer are employed in such relatively small volumes. Furthermore, whereas the solvent, comonomer, and catalyst will contain relatively constant levels of impurity, the concentration of impurity in the formaldehyde is more likely to vary widely. The process of the present invention compensates for the presence of impurity in the reaction system and also for variations in the concentration of impurity. Thus, commercial solvents, formaldehyde, comonomer and catalyst can be employed by using fewer expensive and inconvenient purification steps.

According to the process of the present invention, in order to obtain a high molecular weight oxymethylene copolymer despite the presence of impurity, the total concentration of catalyst and impurity is maintained at a predetermined, optimal value. The optimal value is the concentration of catalyst which yields a high molecular weight copolymer product in a model or "ideal" copolymerization system containing less than approximately 10 p.p.m. impurity. This value is determined experimentally in a copolymerization system using a particular catalyst, solvent, and comonomer. In a preferred embodiment of the present invention which utilizes cyclohexane as the solvent, boron trifluoride dibutyl etherate as the catalyst, and dioxolane as the comonomer, the optical catalyst concentration is commonly less than approximately $1.6 \times 10^{-3}$ mole/liter, preferably within the range of approximately $1.3 \times 10^{-3}$ to $1.6 \times 10^{-3}$ mole/liter, and most preferably approximately $1.4 \times 10^{-3}$ mole/liter.

The concentration of impurity in a second, practical or "real" reaction system which contains such impurity is then determined. The second copolymerization reaction system employs the same compounds as catalyst, solvent, and comonomer as were used in the first reaction system. The concentration of impurity is expressed as moles of impurity per liter, based upon the total liquid volume, including solvent, catalyst, and reactants. The concentration of catalyst in the second reaction system is then adjusted relative to the concentration initially employed so that the total concentration of catalyst and impurity in the second reaction system equals the optimal value of catalyst concentration in the first "pure" reaction system.

In contrast to copolymer molecular weight, which is dependent upon the total concentration of catalyst and impurity, it has been found that the degree of incorporation of comonomer in the oxymethylene copolymer is dependent solely upon catalyst concentration. Thus, as impurity is introduced into the reaction system and catalyst concentration is adjusted downward in order to maintain the optimal total concentration of catalyst and impurity, comonomer concentration must be adjusted upward in order to maintain the desired comonomer content of the copolymer. In copolymerization systems employing a catalyst concentration significantly greater than the concentration of impurity, it has been found that the decrease in comonomer incorporation at constant comonomer concentration as impurity concentration is increased follows a linear relationship. Thus, the comonomer concentration in a reaction system must be increased in direct proportion to any change in impurity concentration and in inverse proportion to any corresponding change in catalyst concentration.

As impurity concentration approaches and exceeds catalyst concentration, the above-described linear relationship is not observed, and the appropriate comonomer concentration cannot be predicted with any reasonable degree of accuracy from the concentration of impurity. Thus, the concentration of impurity in the process of the present invention cannot exceed approximately 70 percent of the catalyst concentration. In a preferred embodiment of the present invention which utilizes cyclohexane as the solvent, boron trifluoride dibutyl etherate as the catalyst, and dioxolane as the comonomer, the concentration of impurity is preferably no greater than approximately $0.65 \times 10^{-3}$ mole/liter.

After the concentration of impurity in the second copolymerization reaction system has been initially determined and the catalyst and comonomer concentrations adjusted accordingly, it is likely that the concentration of impurity may change throughout the course of the reaction due to fluctuations in the impurity content of feed streams. As these changes in impurity concentration are detected and the new impurity concentrations are determined, the catalyst and comonomer concentrations can be adjusted upward or downward in accordance with the process of the present invention as required by variations in impurity concentration.

It is contemplated that the process of the present invention may easily be adapted for use in a totally automated copolymerization system. In such a system, the various feed streams (solvent, formaldehyde, comonomers, and catalyst) are analyzed periodically for the level of impurity therein. Knowing the predetermined total reaction volume, the concentration of impurity in the reaction system can then be readily determined. The concentration of catalyst in the system is then accordingly adjusted so as to maintain a constant total concentration of catalyst and impurity, which corresponds to the optimal catalyst concentration determined in a reaction system containing less than approximately 10 p.p.m. impurity, and a corresponding adjustment in comonomer concentration is made automatically.

Although the theoretical considerations underlying the process of the present invention are not completely understood at present, it is believed that the influence of the presence of impurity during copolymerization on the molecular weight and comonomer content of the copolymer product is due to a chemical interaction between the impurity and the catalyst. Using water as an example of a proton-donating impurity and boron trifluoride dibutyl etherate as catalyst, the predominant reaction is believed to be expressed by the equation $$BF_3 \cdot Bu_2O + H_2O \rightarrow H[BF_3OH] + Bu_2O \quad (1)$$

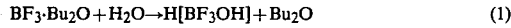

The protonic acid formed functions as a polymerization initiator, as does $BF_3 \cdot Bu_2O$ present in excess. Thus, the total concentration of initiators (catalyst and protonic acid) is equivalent to the concentration of catalyst charged.

An accompanying reaction is a chain transfer reaction whereby existing polymer chains are terminated and catalyst (i.e., initiator) is regenerated:

$$-O^{\oplus}-CH_2 + [BF_3OH]^- \rightarrow -OCH_2OH + BF_3 \quad (2)$$

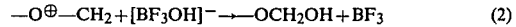

This chain transfer reaction, which regenerates initiator, would not occur in the absence of impurity. Thus, the regeneration of initiator causes the termination of old chains and leads to the formation of new chains. This phenomenon results in, and is evidenced by, a decrease in average molecular weight of the copolymer as impurity is introduced into the copolymerization system. Therefore, in order to maintain a high molecular weight, the total amount of initiator in the reaction system must be controlled. This control is accomplished by maintaining the total concentration of catalyst (initiator) and impurity (which regenerates initiator) at an optimal, predetermined value.

As indicated by the above discussion, the effect of impurity concentration on copolymer molecular weight is independent of the comonomer used.

When secondary and subsequent hydrolysis reactions occur, additional protonic initiators are generated:

$$H[BF_3OH] + H_2O \rightleftharpoons H[BF_2(OH)_2] + HF \quad (3)$$

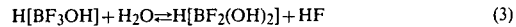

When such reactions occur, effective initiator concentration can greatly exceed the original catalyst concentration. However, when copolymerizations are run with a molar excess of catalyst relative to impurity, effectively the only hydroxyl groups present are those in the hydroxyfluoborate ions (Equation 1). Thus, under such conditions, secondary hydrolysis reactions (Equation 3) are negligible, and initiator concentration can be assumed to be equivalent to the concentration of catalyst charged. This assumption is confirmed by the observation that comonomer incorporation is directly dependent upon the concentration of catalyst charged. If a substantial degree of secondary hydrolysis occurred, initiator concentration would be higher than the concentration of catalyst charged and comonomer incorporation would no longer show a predictable, direct dependence on catalyst concentration. Impurity concentration in the process of the present invention is therefore limited to 70 percent of catalyst concentration, and comonomer concentration can be adjusted accurately and predictably in response to adjustments in catalyst concentration.

The following Experiments are given as specific illustrations of the above discussion. It should be understood, however, that the invention is not limited to the specific details set forth in the Experiments.

EXPERIMENT 1

A series of formaldehyde copolymerization reactions was run using cyclohexane as the solvent, boron trifluoride dibutyl etherate as the catalyst, and dioxolane as the comonomer. The cyclohexane, obtained from Eastman Kodak, was dried by storage over molecular sieves; the boron trifluoride dibutyl etherate, obtained from Pfaltz and Bauer, was vacuum distilled and stored in the dark under nitrogen in vials fitted with Teflon/rubber septa; the dioxolane, obtained from Eastman Kodak, was purified by distillation from potassium metal/lithium aluminum hydride immediately before use. The formaldehyde was generated by cracking purified trioxane and was purified by passing through a series of U-tubes at $-15°$ C. The purified formaldehyde was analyzed by gas chromatography. Water and methanol were undetectable (<8 p.p.m.), as was formic acid (<10 p.p.m.).

The reaction apparatus comprised a polymerization flask fitted with stirrer, condenser, and solvent and reactant inlets. Helium was used as the carrier gas and was purified by being passed through a Go-Getter gas purifier available from General Electric to remove moisture and oxygen.

The polymerization flask was flamed and cooled under a helium purge. Cyclohexane was charged to the flask, and dioxolane was added to give a solution having a concentration of 0.5 mole/liter, based upon the total volume of solvent, catalyst, and comonomer. Boron trifluoride dibutyl etherate was added by syringe in the desired concentration, as shown in Table I. Water was added in controlled amounts with the solvent to give the concentrations shown in Table I. A formaldehyde flow was fed to the reactor until the desired amount of formaldehyde had been delivered. The flow was then diverted, and the reaction was quenched with tri-n-butylamine. The reaction was conducted at a temperature of 37°-38° C. The resulting polymer was filtered, washed three times with acetone, once with methanol, and again with acetone and was then dried at 40° C. in a vacuum oven. The raw polymer was stabilized by refluxing a solution of 1 part by weight of polymer in 9 parts by weight of 50/50 dimethylformamide/benzyl alcohol, together with 0.5 weight percent tri-n-butylamine until no formaldehyde was released. The resulting hydroxyethyl-terminated polymer was washed with acetone and vacuum dried.

The inherent viscosity of the polymer was determined using a solution of 0.1 percent by weight of polymer in p-chlorophenol at 60° C. Comonomer content, expressed as weight percent oxyethylene units ($-CH_2-CH_2-O-$; hereinafter abbreviated as ETOX), was determined by Fourier transform infrared spectroscopy and by gas chromatographic analysis of the acidic (HCl) methanolysis products of the polymer.

The effect of total concentration of catalyst and impurity (water) on the molecular weight of the polymer is shown by the data in Table I.

TABLE I

| Run | $[BF_3 \cdot Bu_2O]$ mole/l. × $10^3$ | $[H_2O]$ mole/l. × $10^3$ | $[BF_3 \cdot Bu_2O + H_2O]$ mole/l. × $10^3$ | I.V. dl./g. |
| --- | --- | --- | --- | --- |
| 1 | 1.1 | 0.3 | 1.4 | 1.9 |
| 2 | 1.0 | 0.5 | 1.5 | 1.8 |
| 3 | 1.5 | 0.2 | 1.7 | 1.6 |
| 4 | 1.2 | 0.6 | 1.8 | 1.4 |
| 5 | 1.4 | 0.6 | 2.0 | 1.3 |

It can thus be seen that molecular weight, as evidenced by the I.V. of the polymer, decreases as the total concentration of catalyst and impurity increases. Thus, according to the present invention, in order to compensate for the presence of impurity in the system, catalyst concentration is decreased in response to any increase in catalyst concentration so that a high molecular weight oxymethylene copolymer can be obtained despite the presence of impurity.

EXPERIMENT 2

A series of formaldehyde copolymerization reactions was conducted as in Experiment 1 except that ethylene oxide was used as the comonomer. The ethylene oxide was used as obtained in lecture bottles from Matheson Chemical Corporation. The ethylene oxide was added continuously during the reaction in admixture with the formaldehyde stream at a ratio of 3 parts ethylene oxide to 97 parts formaldehyde.

The effect of total concentration of catalyst and impurity (water) on the molecular weight of the polymer is shown by the data in Table II.

TABLE II

| Run | $[BF_3 \cdot Bu_2O]$ mole/l. × $10^3$ | $[H_2O]$ mole/l. × $10^3$ | $[BF_3 \cdot Bu_2O + H_2O]$ mole/l. × $10^3$ | I.V. dl./g. |
| --- | --- | --- | --- | --- |
| 1 | 1.5 | 0.4 | 1.9 | 1.3 |
| 2 | 1.5 | 0.6 | 2.1 | 1.2 |
| 3 | 2.0 | 0.4 | 2.4 | 0.8 |
| 4 | 2.0 | 0.5 | 2.5 | 0.7 |

Again, the molecular weight, as evidenced by the I.V., decreased as the total concentration of catalyst and impurity increased. Thus, the observed decrease in molecular weight is not dependent on the comonomer used, on solely the catalyst concentration, or on solely the impurity concentration, but on the total concentration of catalyst and impurity. In order to obtain a high molecular weight copolymer, the catalyst concentration must therefore be adjusted according to the process of the present invention to compensate for the presence of any impurity in the system.

EXPERIMENT 3

A series of formaldehyde copolymerization reactions was conducted as in Experiment 1. The resulting copolymers were analyzed as in Experiment 1, and the results are given in Table III.

TABLE III

| Run | $[BF_3 \cdot Bu_2O]$ mole/l. × $10^3$ | $[H_2O]$ mole/l. × $10^3$ | $[BF_3 \cdot Bu_2 + H_2O]$ mole/l. × $10^3$ | I.V. dl./g. | ETOX wt. % |
| --- | --- | --- | --- | --- | --- |
| 1 | 1.60 | 0.10 | 1.70 | 1.8 | 5.2 |
| 2 | 1.45 | 0.30 | 1.75 | 1.6 | 4.4 |
| 3 | 1.30 | 0.40 | 1.70 | 1.6 | 3.6 |
| 4 | 1.20 | 0.50 | 1.70 | 1.7 | 2.7 |
| 5 | 1.20 | 0.60 | 1.80 | 1.4 | 2.5 |
| 6 | 1.10 | 0.30 | 1.40 | 1.9 | 2.2 |
| 7 | 1.00 | 0.60 | 1.60 | 1.5 | 2.2 |
| 8 | 0.80 | 0.70 | 1.50 | 1.8 | 1.4 |
| 9 | 0.70 | 0.90 | 1.60 | 2.0 | 1.9 |
| 10 | 0.70 | 1.00 | 1.70 | 1.8 | 1.6 |

In this series of reactions, the total concentration of catalyst and impurity was maintained at an approximately constant value. However, the catalyst concentration was decreased as the impurity concentration was increased.

As the data indicate, the molecular weight, as evidenced by the I.V., was approximately constant as a result of the approximately constant total concentration of catalyst and impurity. However, comonomer incorporation, expressed as weight percent ethylene oxide, decreased as catalyst concentration decreased. Comonomer concentration was constant throughout at 0.5 mole/liter. Thus, in order to maintain a desired degree of comonomer content in the copolymer product, the comonomer concentration must be increased in accordance with the process of the present invention in order to compensate for any decrease in catalyst concentration in response to the presence of impurity.

It can be seen that in Runs 8, 9, and 10, as impurity concentration approaches and exceeds catalyst concentration, there is no readily discernible relationship between catalyst concentration and comonomer content. Thus, according to the process of the present invention, impurity concentration must be less than approximately 70 percent of catalyst concentration in order to reliably estimate the relationship between comonomer incorporation and catalyst concentration. As may be seen by Runs 8, 9, and 10 of Experiment 3, copolymers of useful molecular weight and composition can still be prepared when impurity concentration exceeds 70 percent of catalyst concentration; however, reliable control over the copolymer product in accordance with the process of the present invention can no longer be achieved.

Although the invention has been described with preferred embodiments, it is to be understood that variations and modifications may be employed as will be apparent to those skilled in the art. Such variations and modifications are to be considered within the purview and scope of the appended claims.

We claim:

1. A process for the production of high molecular weight oxymethylene copolymer having a predetermined comonomer content, said process compensating for the presence of impurity during the copolymerization, said oxymethylene copolymer having recurring units consisting essentially of (A) —OCH$_2$—groups with which are interspersed

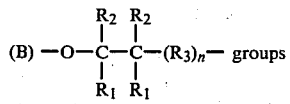

where each R$_1$ and R$_2$ are selected from the group consisting of hydrogen, lower alkyl radicals, and halogen substituted lower alkyl radicals, each R$_3$ is selected from the group consisting of methylene, oxymethylene, lower alkyl and haloalkyl substituted methylene, and lower alkyl and haloalkyl substituted oxymethylene radicals, and n is an integer from 0 to 3, each lower alkyl radical having 1 to 2 carbon atoms, said (A) groups constituting 85 to 99.9 percent of the recurring units, wherein said oxymethylene copolymer is formed by the reaction of formaldehyde and a comonomer in the presence of a solvent and an inorganic fluoride catalyst, said comonomer comprising at least one cyclic ether having adjacent carbon atoms and being capable of copolymerizing with formaldehyde and said solvent being selected from the group consisting of cyclopentane, cyclohexane, cycloheptane, alkyl derivatives of the foregoing wherein the alkyl groups contain up to 4 carbon atoms, and mixtures thereof, said process comprising the steps of:
 (a) determining the optimal concentration of catalyst in a first oxymethylene copolymerization system containing less than approximately 10 p.p.m. of impurity containing active protons, said optimal concentration of catalyst providing high molecular weight oxymethylene copolymer product;
 (b) determining the concentration of impurity in a second oxymethylene copolymerization system containing said impurity, said impurity containing at least one active proton;
 (c) adjusting the concentration of said catalyst in said second oxymethylene copolymerization system so that the total concentration of said impurity and said catalyst in said second oxymethylene copolymerization system is maintained at said optimal concentration of catalyst in said first oxymethylene copolymerization system, the concentration of said impurity being no greater than approximately 70 percent of the concentration of said catalyst; and
 (d) adjusting the concentration of said comonomer in said second oxymethylene copolymerization system to compensate for the adjustment in the concentration of said catalyst so as to maintain said predetermined comonomer content in said oxymethylene copolymer product.

2. The process of claim 1 wherein said comonomer is selected from the group consisting of ethylene oxide, dioxolane, trimethylene oxide, 1,2-propylene oxide, 1,2-butylene oxide, 1,3-butylene oxide, 2,2-di(chloromethyl)-1,3-propylene oxide, and mixtures thereof.

3. The process of claim 2 wherein said comonomer is selected from the group consisting of ethylene oxide, dioxolane, and mixtures thereof.

4. The process of claim 1 wherein said solvent comprises cyclohexane.

5. The process of claim 1 wherein said impurity containing active protons is from the group consisting of water, formic acid, methanol, and mixtures thereof.

6. The process of claim 5 wherein said impurity is water.

7. The process of claim 1 wherein said catalyst is selected from the group consisting of antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, fluorosulfonic acid, boron trifluoride, boron trifluoride dibutyl etherate, boron trifluoride diethyl etherate, and mixtures thereof.

8. The process of claim 7 wherein said catalyst is selected from the group consisting of boron trifluoride, boron trifluoride dibutyl etherate, boron trifluoride diethyl etherate, and mixtures thereof.

9. A process for the production of high molecular weight oxymethylene copolymer having a predetermined comonomer content, said process compensating for the presence of impurity during the copolymerization, said oxymethylene copolymer having recurring units consisting essentially of (A) —OCH$_2$—groups with which are interspersed (B) —O—CH$_2$—CH$_2$-(OCH$_2$)$_{\overline{n}}$ groups where n is 0 or 1, said (A) groups constituting 85 to 99.9 percent of the recurring units, wherein said oxymethylene copolymer is formed by the reaction of formaldehyde and a comonomer in the presence of cyclohexane solvent and a catalyst selected from the group consisting of boron trifluoride, boron trifluoride dibutyl etherate, boron trifluoride diethyl etherate, and mixtures thereof, said comonomer being selected from the group consisting of ethylene oxide, dioxolane, and mixtures thereof, said process comprising the steps of:
 (a) determining the optimal concentration of catalyst in a first oxymethylene copolymerization system containing less than approximately 10 p.p.m. of impurity containing active protons, said optimal concentration of catalyst being less than approximately $1.6 \times 10^{-3}$ moles per liter, based upon the total liquid volume of solvent, catalyst, and reactants, said optimal concentration of catalyst providing high molecular weight oxymethylene copolymer product;
 (b) determining the concentration of impurity in a second oxymethylene polymerization system containing said impurity, said impurity containing at least one active proton and said concentration of impurity being no greater than approximately $0.65 \times 10^{-3}$ moles per liter, based upon the total liquid volume of solvent, catalyst, and reactants;

(c) adjusting the concentration of said catalyst in said second oxymethylene copolymerization system so that the total concentration of said impurity and said catalyst in said second oxymethylene copolymerization system is maintained at said optimal concentration of catalyst in said first oxymethylene copolymerization system; and (d) adjusting the concentration of said comonomer in said second oxymethylene copolymerization system to compensate for the adjustment in the concentration of said catalyst so as to maintain said predetermined comonomer content in said oxymethylene copolymer product.

10. The process of claim 9 wherein said predetermined comonomer content is such that said oxymethylene copolymer comprises 1 to 5 percent by weight —O—CH$_2$—CH$_2$— units.

11. The process of claim 9 wherein said optimal concentration of catalyst is within the range of approximately 1.3 to $1.6 \times 10^{-3}$ moles per liter, based upon the total liquid volume of solvent, catalyst, and comonomer.

12. The process of claim 11 wherein said optimal concentration of catalyst is approximately $1.4 \times 10^{-3}$ moles per liter, based upon the total liquid volume of solvent, catalyst, and reactants.

13. The process of claim 9 wherein said oxymethylene copolymer exhibits an inherent viscosity of at least 1.4 dl./g. when measured in a concentration of 0.1 percent by weight in p-chlorophenol at 60° C.

14. The process of claim 13 wherein said oxymethylene copolymer exhibits an inherent viscosity within the range of approximately 1.4 to 2.0 dl./g. when measured in a concentration of 0.1 percent by weight in p-chlorophenol at 60° C.

15. The process of claim 9 wherein said impurity containing active protons is from the group consisting of water, formic acid, methanol, and mixtures thereof.

16. The process of claim 15 wherein said impurity is water.

17. A process for the production of high molecular weight oxymethylene copolymer having a predetermined comonomer content such that said oxymethylene copolymer comprises 1 to 5 percent by weight —O—CH$_2$—CH$_2$—units, said process compensating for the presence of impurity during the copolymerization, said oxymethylene copolymer having recurring units consisting essentially of (A) —OCH$_2$—groups with which are interspersed (B) —O—CH$_2$—CH$_2$-(O—CH$_2$)$_n$ groups where n is 0 or 1, said (A) groups constituting 85 to 99.9 percent of the recurring units, wherein said oxymethylene copolymer is formed by the reaction of formaldehyde and a comonomer in the presence of cyclohexane solvent and a catalyst selected from the group consisting of boron trifluoride, boron trifluoride dibutyl etherate, boron trifluoride diethyl etherate, and mixtures thereof, said comonomer being selected from the group consisting of ethylene oxide, dioxolane, and mixtures thereof, said process comprising the steps of:

(a) determining the optimal concentration of said catalyst in a first oxymethylene copolymerization system containing less than approximately 10 p.p.m. of impurity containing active protons, said impurity being from the group consisting of water, formic acid, methanol, and mixtures thereof, said optimal concentration of catalyst being within the range of approximately $1.3 \times 10^{-3}$ to $1.6 \times 10^{-3}$ moles per liter, based upon the total liquid volume of solvent, catalyst, and reactants and said optimal concentration of catalyst providing high molecular weight oxymethylene copolymer product exhibiting an inherent viscosity of at least approximately 1.4 dl./g. when measured in a concentration of 0.1 percent by weight in p-chlorophenol at 60° C.;

(b) determining the concentration of impurity in a second oxymethylene polymerization system containing said impurity, said impurity containing at least one active proton and said concentration of impurity being no greater than approximately $0.65 \times 10^{-3}$ moles per liter, based upon the total liquid volume of solvent, catalyst, and reactants;

(c) adjusting the concentration of said catalyst in said oxymethylene copolymerization system so that the total concentration of said impurity and said catalyst in said second oxymethylene copolymerization system is maintained at said optimal concentration of catalyst in said first oxymethylene copolymerization system;

(d) adjusting the concentration of said comonomer in said second oxymethylene copolymerization system to compensate for the adjustment in the concentration of said catalyst so as to maintain said predetermined comonomer content in said oxymethylene copolymer product.

18. The process of claim 17 wherein said optimal concentration of catalyst is approximately $1.4 \times 10^{-3}$ moles per liter, based upon the total liquid volume of solvent, catalyst, and reactants.

19. The process of claim 17 wherein said oxymethylene copolymer exhibits an inherent viscosity within the range of approximately 1.4 to 2.0 dl./g. when measured in a concentration of 0.1 percent by weight in p-chlorophenol at 60° C.

20. The process of claim 17 wherein said impurity is water.

* * * * *